W. B. WILLS & N. C. MILES.
FOLDING CANNING TRAY.
APPLICATION FILED MAY 31, 1918.
1,283,389.
Patented Oct. 29, 1918.
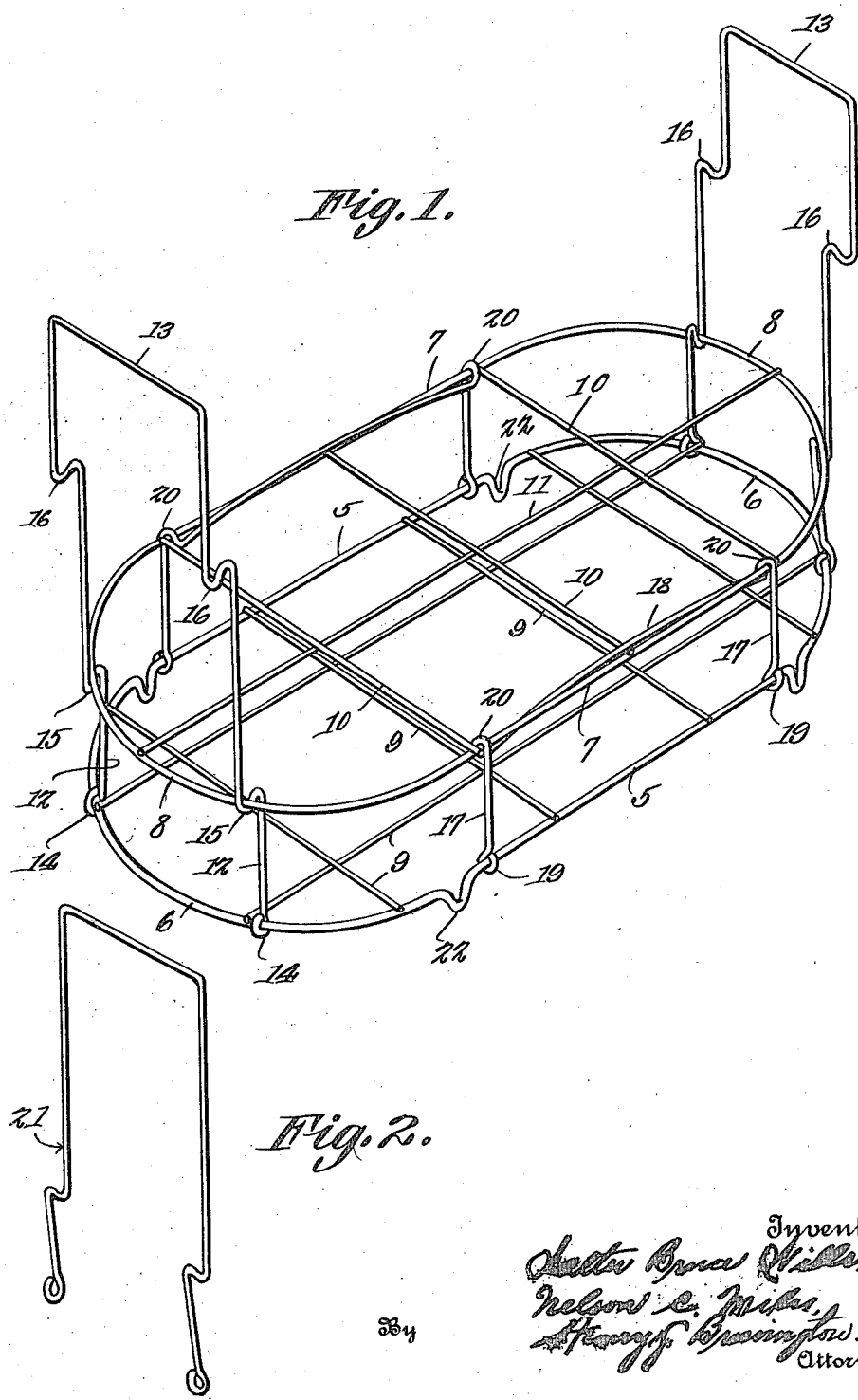

UNITED STATES PATENT OFFICE.

WALTER BRUCE WILLS AND NELSON C. MILES, OF BALTIMORE, MARYLAND.

FOLDING CANNING-TRAY.

1,283,389.

Specification of Letters Patent.      Patented Oct. 29, 1918.

Application filed May 31, 1918.   Serial No. 237,429.

*To all whom it may concern:*

Be it known that we, WALTER BRUCE WILLS and NELSON C. MILES, citizens of the United States, residing at Baltimore city, State of Maryland, have invented certain new and useful Improvements in Folding Canning-Trays, of which the following is a specification.

This invention relates to trays for holding cans of fruit or vegetables in a cooking or steaming vessel while the contents of such cans are undergoing a preserving or cooking process.

The invention has for its object to provide a tray of the kind stated which is very simple in construction so that it can be cheaply produced, and which is also foldable into small and compact form for convenience in shipment and storage.

The object stated is attained by means of a novel combination and arrangement of parts to be hereinafter described and claimed, and in order that the same may be better understood, reference is had to the accompanying drawing forming a part of this specification.

In the drawing—

Figure 1 is a perspective view of the tray, and

Fig. 2 is a perspective view of a modified form of holding device.

Referring specifically to the drawing, the tray is composed of open-work top and bottom members with a suitable connection therebetween for holding the same in spaced relation. The bottom member consists of a piece of wire which is bent to form parallel side portions 5 and connecting end portions 6. The top member also consists of a piece of wire bent to form side portions 7 and connecting end portions 8. The bottom member also has transverse and longitudinal wires 9 which are brazed, soldered or otherwise permanently connected to the parts 5 and 6, respectively. The top member has a series of spaced transverse wires 10 and a central longitudinal wire 11 permanently connected to the parts 7 and 8, respectively.

The cans to be supported by the tray, are placed between the top wires 10 and 11, the same dividing the device into separate compartments to space the cans, and the latter seat on the open-work bottom member formed by the wires 5, 6 and 9. The cans are thus securely held, and as the tray is of open-work construction, the water or steam has access to all parts of the outside of the cans.

To each end portion 6 of the bottom member is pivoted a wire bail composed of laterally spaced branches 12 having a cross connecting portion 13 at one end. The other ends of the bail branches are bent around the parts 6, as shown at 14, in such a manner as to provide a pivotal connection for the bail. Intermediate their ends, the bail branches are bent to form shoulders 15 on which seat the end portions 8 of the top member, and higher up on the branches are made shoulders 16 which are designed to hook over the edge of the cooking or steaming vessel in which the tray, with the cans thereon, is placed, whereby the tray and its contents are properly held suspended in such vessel. The cross portion 13 of the bail at the outer end thereof, affords a convenient handle for lifting the tray out of the vessel.

On each side of the tray is also positioned another bail composed of spaced branches 17 having a connecting part 18 at one end, and pivotally connected at their other ends to the sides 5 of the bottom member, as shown at 19, in the same manner as the first-mentioned bail. At the junction of the parts 17 and 18, the wire forming the same is bent into hooks 20 which are slipped over the side portions 7 of the top member.

When the end and side bails hereinbefore described are positioned as shown in Fig. 1, the top and bottom members are securely held in spaced relation, and the device is now ready for use. As the bails are pivoted to the bottom member, the device is foldable into compact form, this being done in the following manner:

The end bails are swung outward to disengage the shoulders 15 and the end portions 8 of the top member, which releases the top member so that it can be lowered to seat on top of the bottom member. When the top member is lowered, its side portions 7 are freed from the hooks 20, which allows the side bails to be folded inward and down on top of the top member, and the end bails are also foldable inward and downward on top of the other folded parts.

When the device is not to be suspended in the steaming or cooking vessel, the bail 21 shown in Fig. 2 is substituted for the end bails hereinbefore described. This bail is the same as the first-mentioned one, except that it is devoid of the hooks 16, these not being necessary when the tray is to rest on the bottom of the vessel, and in order that it may be placed on said bottom in spaced relation therewith, the parts 5 have short foot portions 22 which seat on the bottom of the vessel.

We claim:

A tray of the kind described, comprising an open-work frame having top and bottom members, bails connected to the ends of the bottom member and having shoulders on which the ends of the top member seat for holding said member spaced from the bottom member, and bails connected to the sides of the bottom member and having hooks detachably engageable over the sides of the top member, the aforesaid end bails being pivoted to disengage their shoulders and allow the top member to be seated on top of the bottom member when the aforesaid hooks are disengaged, and the end and side bails being foldable on top of the lowered top member.

In testimony whereof we affix our signatures in presence of two witnesses.

WALTER BRUCE WILLS.
NELSON C. MILES.

Witnesses:
E. WALTON BREWINGTON,
HOWARD D. ADAMS.